(12) United States Patent
Iijima

(10) Patent No.: US 6,713,531 B2
(45) Date of Patent: Mar. 30, 2004

(54) WATER-BASED PIGMENTED INK FOR INK JET PRINTING AND INK JET RECORDING METHOD

(75) Inventor: Hirotaka Iijima, Hino (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 10/187,487

(22) Filed: Jul. 2, 2002

(65) Prior Publication Data

US 2003/0105187 A1 Jun. 5, 2003

Related U.S. Application Data

(62) Division of application No. 09/624,295, filed on Jul. 24, 2000, now abandoned.

(30) Foreign Application Priority Data

Aug. 5, 1999 (JP) ............................................. 11/223106

(51) Int. Cl.$^7$ ............................. C09D 11/10; B41J 2/01
(52) U.S. Cl. ........................ 523/160; 347/100; 347/105
(58) Field of Search ................................ 523/160, 161; 347/100, 101, 105, 106; 106/3.6

(56) References Cited

U.S. PATENT DOCUMENTS

| | | | |
|---|---|---|---|
| 5,748,208 A | 5/1998 | Uchiyama et al. | |
| 5,781,215 A | * 7/1998 | Onishi et al. | 347/101 |
| 6,099,629 A | 8/2000 | Morita et al. | |
| 6,180,219 B1 | * 1/2001 | Hoshino et al. | 428/312.2 |
| 6,367,921 B1 | * 4/2002 | Kurabayashi et al. | 347/101 |
| 6,498,202 B1 | * 12/2002 | Sun et al. | 523/160 |

FOREIGN PATENT DOCUMENTS

| | | | |
|---|---|---|---|
| EP | 709221 A1 | * | 5/1996 |
| EP | 0 767 225 A2 | | 4/1997 |
| EP | 0 796 901 A2 | | 9/1997 |
| EP | 0 812 888 A | | 12/1997 |
| EP | 0 832 741 A2 | | 4/1998 |
| EP | 0 859 037 A1 | | 8/1998 |

* cited by examiner

Primary Examiner—Callie Shosho
(74) Attorney, Agent, or Firm—Frishauf, Holtz, Goodman & Chick, P.C.

(57) ABSTRACT

A water-based pigmented ink for use in ink jet printing is disclosed, comprising a pigment and a latex, wherein the average particle size of the pigment (a) and the average particle size of the latex (b) are 10 to 150 nm and 10 to 100 nm, respectively, and satisfying the following requirement $$0.5 \leq a/b \leq 4$$

and the content of the latex being 0.1 to 10% by weight.

7 Claims, No Drawings

WATER-BASED PIGMENTED INK FOR INK JET PRINTING AND INK JET RECORDING METHOD

This application is a division of U.S. application Ser. No. 09/624,295, filed Jul. 24, 2000, now abandoned.

FIELD OF THE INVENTION

The present invention relates to a pigmented ink used for ink jet printing and an ink jet recording method, specifically, to a water-based pigmented ink used for ink jet printing and an ink jet recording method by the use thereof; and in particular, to a water-based pigmented ink used for ink jet printing superior in discharge stability, thereby leading to formation of images exhibiting high glossiness, and superior water-proof and abrasion resistance on a glossy medium used for ink jet printing, and an ink jet recording method by the use thereof.

BACKGROUND OF THE INVENTION

Ink jet recording methods enable high definition recording by using a relative simple apparatus, having made rapid development in various field. There are also manufactured printers employing an ink jet recording system for use in various field and the inks used therein include diverse kinds in accordance with the usage thereof.

As an ink used for images which required resistance to photofading, for example, pigment inks using a pigment superior in light fastness as a colorant are used. In cases when the image printed on media having a high surface glossiness such as glossy paper or glossy films used for ink jet recording, pigment inks tend to be inferior in adhesion to the media, compared to dye inks, often leading to insufficient water resistance or insufficient abrasion resistance.

Swell-type media, in which water-soluble binder is coated, or void-type media, in which the fine void structure is formed of a filler and binder are preferably employed to display such high glossiness. In the void type media, the size of pores formed on the media surface are designed to be smaller to display such high glossiness, compared to plain paper or coated paper and the size of pores formed on the media surface is generally smaller than the mean size of the pigment particles. Almost material to be put into the interior is liquid contained in the ink. Therefore, in cases where being recorded with a pigment ink on the media having a high surface glossiness, it is contemplated that the main factor with regard to insufficient resistance to abrasion is that most of the pigment particles are fixed on the media surface.

To enhance the water resistance of pigment inks, for examples, the use of oil-based inks using oil-soluble solvents was proposed. The use of oil-based inks, though often enhancing advantageously water resistance of recorded images, produces problems such as odor or safety concerns of the solvent and necessity of media suitable for the oil-based inks. Further, oil-based inks still have a problem regarding abrasion resistance.

There was also proposed to improve water resistance using so-called solid jet ink in which solid wax is discharged through a solution. The solid jet ink has less of a problem in its odor and safety concerns, or selection of suitable media, compared to oil-based pigment inks, but produces problems that an apparatus tends to be large due to the complex internal mechanism of the printer and a large amount of energy is required to dissolve the ink. Further, similarly to the oil-based pigment inks, the solid jet inks has a problem in abrasion resistance.

There have been proposed various techniques for making improvements in water resistance and abrasion resistance of water base inks. JP-A 56-84992, 59-20696 and 59-155089 (hereinafter, the term, JP-A means unexamined and published Japanese Patent Application) describe incorporation of a cationic compound into a recording layer of the recording media to fix an anionic dye contained in a water ink to improve water resistance. However, there were still problems such that the improvement of water resistance of a pigment ink fixed on the media surface was not at a sufficient level in this technique and recording media exclusively used therefor were needed.

JP-A 63-299971, 64-69381, 6-99576, 8-20159 and 8-218498 describe a technique for improving water resistance, in which a colorless ink containing a cationic compound is allowed to combine with an anionic colorant-containing ink on recording images. In this technique, however, there were problems that one or more series of nozzles exclusively used for discharging the colorless ink are needed and plural cleaning mechanisms of the head were needed, often making the apparatus excessively large and complex.

JP-A 8-311383 describes addition of a pigment having a mean particle size of not more than 0.3 $\mu$m in an amount of 1 to 10% by weight and a neutralization product of an alkali-soluble resin having a weight-averaged molecular weight of not more than 20,000 in an amount of 3 or more times the pigment into a water ink, thereby improving water resistance and abrasion resistance of printed images. However, there were still problems in this technique that the increased content of the resin caused an increase in viscosity of the entire ink, necessitating high energy in its discharge or often making it difficult to stably discharge it.

JP-B 60-32663 (hereinafter, the term, JP-B means published Japanese Patent) and JP-A 4-18462 describe a technique for improving water resistance and abrasion resistance, in which a latex is incorporated in the ink. This technique, however, resulted in problems in the media having high glossiness that incorporation of a latex in the ink in an amount sufficient to effectuate water resistance and abrasion resistance tended to cause deterioration in storage stability of the ink or occurrence of clogging in the nozzle section of the head or in the filter section.

As described in the foregoing, methods conventionally known in the art were proved to be difficult to make improvements in water resistance and abrasion resistance of pigment inks, and there were also problems that deterioration in ink storage stability, clogging of the nozzle and deterioration in discharge stability tend to occur. Further, in cases when the media to be recorded are glossy paper or glossy film used for ink jet printing, both of which exhibit high surface glossiness, pigment are fixed on the media surface, making it more difficult to improve water resistance or abrasion resistance, as compared to plain paper or coated paper in which pigments are easily fixed in the interior of the media.

In cases where recorded on media exhibiting high surface glossiness, not only water resistance and abrasion resistance, but also texture of the images, specifically exhibiting high glossiness and no difference in glossiness from the non-printed portions (white background) are required. As described above, when recorded with a pigment ink on glossy paper or film, most of the pigment is fixed on the surface of the media so that texture is liable to be deteriorated, compared to dye inks. Further, there arose a problem that the technique applied to the ink to enhance water resistance and abrasion resistance readily induced deterioration in texture. Furthermore, in cases where printing with the pigment ink on transparent media, light transmittance in image areas was deteriorated due to optical scattering, producing problems that when images are projected on a screen using an overhead projector, images with deteriorated chroma were easily formed.

SUMMARY OF THE INVENTION

Accordingly, it is an object of the present invention to provide a water base pigment ink used for inkjet printing, thereby leading to formation of images exhibiting high glossiness, and superior water resistance and abrasion resistance on glossy media used for ink jet printing, and an ink jet recording method by the use thereof.

Further, it is an object of the invention to provide a water-based pigmented ink used for inkjet printing, thereby leading to formation of images exhibiting high transparency, and superior water-proof and abrasion resistance on transparent media used for ink jet printing, and an ink jet recording method by the use thereof.

The above objects can be accomplished by the following constitution:

(1) A water-based pigmented ink for use in ink jet printing comprising a pigment and a latex, wherein the average particle size of the pigment is not less than 10 nm and not more than 150 nm and the average particle size of the latex is not less than 10 nm and not more than 100 nm, and meeting the following requirement and the content of the latex being not less than 0.1% by weight and not more than 10% by weight, based on the ink:

$0.5 \leq a/b \leq 4$ where "a" is the average particle size of the pigment (expressed in nm) and "b" is the average particle size of the latex (expressed in nm);

(2) The water-based pigmented ink for ink jet printing described in (1) above, wherein the latex is a soap-free latex, the content of the soap-free latex being not more than 0.1% by weight and not more than 10% by weight;

(3) The water-based pigmented ink for ink jet printing described in (1) or (2), wherein the ink contains an alkyl ether of a polyhydric alcohol in an amount of not less than 1% by weight;

(4) The water-based pigmented ink for ink jet printing described in in any one of (1) through (3), wherein the ink contains a compound represented by the following formula (I):

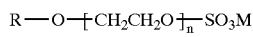
formula (I)

$R—O—(CH_2CH_2O)_n—SO_3M$ where R is a saturated or unsaturated hydrocarbon group; n is an integer of 2 to 20; and M is sodium, potassium, lithium or a quaternary ammonium;

(5) The water-based pigmented ink for ink jet printing described in any one of (1) through (3), wherein the ink contains a fluorinated surfactant;

(6) The water-based pigmented ink for ink jet printing described in any one of (1) through (5), wherein the ink contains a hydrophilic silicone compound;

(7) An ink jet recording method, wherein ink jet recording is made on a recording medium exhibiting a glossiness at an angle of 600 of not less than 30% by the use of a water-based pigmented ink for ink jet printing as described in any of the foregoing (1) through(6);

(8) An ink jet recording method, wherein ink jet recording is made on a transparent medium for ink jet printing by the use of a water-based pigmented ink for ink jet printing as described in any of the foregoing (1) through (6).

DETAILED DESCRIPTION OF THE INVENTION

The latex used in the water-based pigmented ink for ink jet printing according to this invention will now be described. In this invention, the latex refers to polymer particles dispersed in a medium. Examples of polymers used include styrene-butadiene copolymer, polystyrene, acrylonitrile-butadiene copolymer, acrylic acid ester copolymer, polyurethane, silicone-acryl copolymer and acryl-modified fluororesin. Of these are preferred acrylic acid ester copolymer, polyurethane and silicone-acryl copolymer.

The latexes used in this invention include those in which polymer particles are dispersed using a surfactant or without a surfactant. Low molecular weight surfactants are usually employed as an emulsifying agent, and high molecular weight surfactants (e.g., polymers with attached solubilizing groups through graft bonding, a block copolymer comprised of a solubilizing group-containing monomer and a monomer containing an insoluble moiety, etc.) are also employed as an emulsifying agent. The soap-free latexes used in this invention are latexes in which a low molecular weight surfactant is not used (i.e., substantially free of soap), and latexes in which a high molecular weight surfactant is used and latexes in which an emulsifying agent is not used are called a soap-free latex.

Latexes used in this invention may be ones using an emulsifying agent and ones without using an emulsifying agent. In cases where using an emulsifying agent, emulsifying agents used in this invention include any type of ones, irrespective of the dispersion form thereof. A soap-free latex is preferred in terms of storage stability of the ink.

The latexes used in this invention include not only those which are comprised of polymer particles having a homogeneous composition within the grain, but also those which are comprised of core/shell type polymer particles comprising an interior portion and exterior portion which are different in composition. This core/shell type latex is also preferably used in this invention.

The average size of polymer particles in the latex used in this invention is not less than 10 nm and not more than 100 nm, and preferably not less than 10 nm and not more than 50 nm. In cases when the average particle size exceeds 100 nm, deterioration in sensation of image glossiness occurs and in cases when the average particle size is less than 10 nm, sufficient water resistance and abrasion resistance can be achieved. The average size of the polymer particles in a latex can be determined by commercially available particle size measuring instruments employing a light scattering method, electrophoresis method or laser Doppler method.

The latex is contained in an amount of 0.1 to 10% solid, and preferably 0.5 to 3% solid (as a solid content), based on the total weight of an ink. In cases when the solid content of the latex is less than 0.1% by weight, sufficient water resistance can not be achieved and the solid content of more than 10% by weight often produced problems in aging stability of the ink, such that an increase of ink viscosity or an increase of pigment particles tend to occur after being aged.

Organic and inorganic pigments commonly known in the art are usable as a pigment in this invention. Examples thereof include azo pigments such as azo-lake pigment, insoluble azo pigment, condensation azo pigments, and chelate azo pigments; polycyclic pigments such as phthalocyanine pigment, perylene or perinone pigment, anthraquinone pigment, quinocridone pigment, dioxanedine pigment, thioindigo pigment, isoindolinone pigment and quinophthalone pigment; dye lake such as basic dye type lake and acid dye type lake; organic pigments such as nitro pigments, nitroso pigments, aniline black and day light fluorescent pigments; and inorganic pigments such as carbon black.

Dispersing agents used for dispersing pigments include, for example, surfactants such as higher fatty acid salts, alkyl sulfate, alkylester sulfuric acid salts, alkylsulfonic acid salts, sulfosuccinic acid salts, naphthalenesulfonic acid salts, alkylphosphoric acid salts, polyoxyalkelene alkylenether phosphoric acid salts, polyoxyalkylene alkylphenyl ether, polyoxyethylene polyoxypropylene glycol, glycerin ester, sorbitan ester, polyoxyethylene fatty acid amide, and amineoxide; block copolymers or random copolymers comprised of at least two monomer selected from styrene and styrene derivative, vinylnaphthalene derivatives, acrylic acid, acrylic acid derivatives, maleic acid, maleic acid derivatives, itaconic acid, itaconic acid derivatives, fumaric acid and fumaric acid derivatives, and their salts.

Pigments can be dispersed by means of a ball mill, sand mill, atreiter, roll mill, agitator, henshell mill, colloid mill, ultrasonic homogenizer, pearl mill, wet jet mill and paint shaker alone or in combination. It is preferred to remove coarse components from the pigment dispersion using a centrifugal apparatus or a filter.

The average size of pigment particles dispersed in the water-based pigmented ink according to this invention is not less than 10 nm and not more than 150 nm, preferably not less than 10 nm and not more than 120 nm, and more preferably not less than 10 nm and not more than 100 nm. In cases when the average particle size is more than 150 nm, marked deterioration in sensation of glossiness occurs in images printed on a glossy medium and deterioration in transparency occurs in imaged printed on a transparent medium. In the case of less than 10 nm, stability of the pigment dispersion is deteriorated and storage stability of the ink tends to deteriorate. The average size of the pigment particles in the ink can be determined by commercially available particle size measuring instruments employing a light scattering method, electrophoresis method or laser Doppler method. Alternatively, using a transmission electronmicroscope, at least 100 particles are photographed and the obtained images are subjected to a statistical treatment using a image analysis software such as Image-Pro (available from Media Cybernetics Corp.) to determine the particle size. A ratio of the average particle size of a pigment (a nm) to the average particle size of a latex (b nm), i.e., a/b is not less than 0.5 and not more than 4. In cases where the particle size distribution of the pigment dispersion or latex has plural peaks, the average particle size of the pigment or latex is one which can be obtained by subjecting the peaks to a statistical treatment.

As a result of studies by the inventors of this invention, it was found that the foregoing relationships are necessary to obtain highly glossy images on glossy media or transparent media for ink jet printing and also to form images superior in water resistance and abrasion resistance. Thus, it was found that the latex content of 0.1 to 10% by weight was needed to achieve superior ink storage stability and the difference in particle size between a pigment and a latex should not be so large to achieve high glossiness and high transparency while maintaining such latex content. It was further found that when a ratio of the average particle size of a latex (a) to that of a pigment (b), i.e., a/b was less than 0.5, glossiness was markedly deteriorated, and when the a/b was more than 4, water resistance and abrasion resistance were deteriorated; and the relationship in average particle size between the pigment and latex having such values as threshold values was found to achieve this invention.

Inks used in color ink jet printers are usually yellow, magenta, cyan and black inks. In some specific printers, inks different in color density or specified color inks of such as green, orange or blue are also employed. The present invention can be effectuated in any ink. In cases where plural inks are used in the printer, at least one of them needs to meet the requirement in this invention.

Examples of an alkyl ether of a polyhydric alcohol usable in the water-based pigmented ink for ink jet printing include ethylene glycol monomethyl ether, ethylene glycol monoethyl ether, ethylene glycol monobutyl ether, ethylene glycol dimethyl ether, diethylene glycol monomethyl ether, diethylene glycol monoethyl ether, diethylene glycol monobutyl ether, diethylene glycol dimethyl ether, diethylene glycol diethyl ether, triethylene glycol monoethyl ether, triethylene glycol monomethyl ether, triethylene glycol monobutyl ether, triethylene glycol diethyl ether, triethylene glycol diethyl ether, tetraethylene glycol monomethyl ether, tetraethylene glycol monoethyl ether, tetraethylene glycol monobutyl ether, tetraethylene glycol dimethyl ether, and tetraethylene glycol diethyl ether. Of these, an alkyl ether of a polyhydric alcohol in which at least one of terminal hydroxy groups is etherified with an alkyl is preferred in terms of miscibility with water. The alkyl ether of polyhydric alcohol is contained preferably in an amount of not less than 1% by weight, based the ink for the purpose of enhancing glossiness.

In formula (I), R represents a saturated or unsaturated hydrocarbon group, and preferably a straight-chaine or branched alkyl group, alkylphenyl group or alkylnaphthyl group; n is an integer of 2 to 20; and M is sodium, potassium, lithium or a quaternary ammonium.

Exemplary examples of the compound represented by formula (I) used in the ink for ink jet printing are shown below.

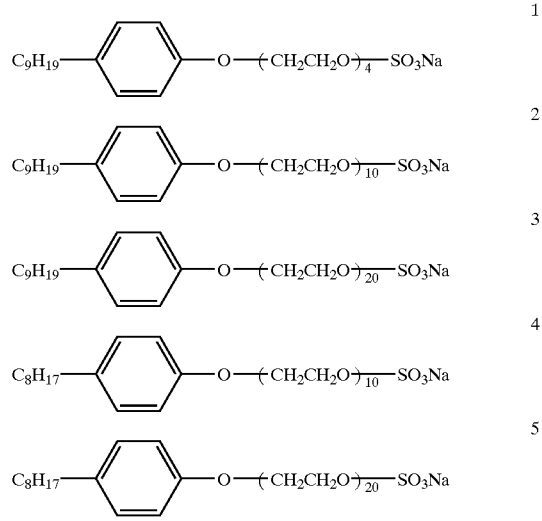

-continued

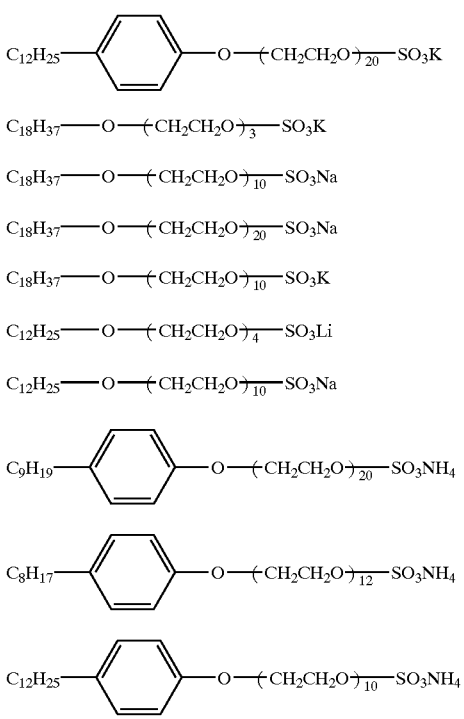

The content of the compound represented by formula (I) is preferably 0.01 to 3% by weight, based on the water-based pigmented ink for ink jet printing.

Fluorinated surfactants usable in the water-based pigmented ink for ink jet printing may be any one of anionic type, cationic type and nonionic type surfactants. The surfactants can be used alone or in combination, and anionic and nonionic fluorinated surfactants are preferably used. Examples of the fluorinated surfactant include Megafac F-110, F-120, F-142D, F-144D, F-177 and F-191 (which are available from Dainippon Ink Co. Ltd.) and Florade FC-93, FC-95, FC-129, FC-170C, FC-430 and FC-431 (which are available from Sumitomo 3M Corp.). The content of the fluorinated surfactant in the water-based pigmented ink for ink jet printing is preferably 0.01 to 3% by weight, based on the ink.

The hydrophilic silicone compound uses in this invention refers to a polysiloxane compound containing a hydrophilic group such as a polyalkylene oxide group, carboxy group and sulfo group, at the terminal position or in a side chain. Examples thereof include silicone surfactant SH3746, SH3748, SH3749 and SH3771, available from Toray-Dow Corning Silicone Co. Ltd.; non-reactive silicone oil KF-351, KF-352, KF-353, KF-354, KF-355, KF-945, KF-618, KF-6011 and KF-700, available from Shinetsu Chem. Ind. Co. Ltd. The content of the hydrophilic silicone compound is preferably 0.01 to 3% by weight, based on ink.

The present invention will be further described based on preferred embodiments of this invention. Aqueous-soluble organic solvents may optionally be added to the water-based pigmented ink according to this invention. Preferred examples of the aqueous-soluble organic solvents include alcohols (e.g., methanol, ethanol, propanol, isopropanol, butanol, isobutanol, sec-butanol, tert-butanol, pentanol, hexanol, cyclohexanol, benzyl alcohol, etc.), polyhydric alcohols (e.g., ethylene glycol, diethylene glycol, triethylene glycol, polyethylene glycol, propylene glycol, dipropylene glycol, polypropylene glycol, butylenes glycol, hexanediol, pentanediol, glycerin, hexanetriol, thiodiglycol, etc.), amines (e.g., ethanolamine, diethanolamine, triethanolamine, N-methyldiethanolamine, N-ethyldiethanolamine, morpholine, N-ethylmorpholine, ethylenediamine, ethylentriamine, triethylenetetramine, tetraethylenepentamine, polyethyleneimine- pentamethyldiethylenetriamine, tetramethylpropyl- enediamine, etc.), amides (e.g., formamide, N,N-dimethylformamide, N,N-dimethylacetoamide, etc.), heterocycles (e.g., 2-pyrrolidone, N-methyl-2-pyrrolidone, cyclohexylpyrrolidone, 2-oxazolidone, 1,3-dimethyl-2-imidazolidinone, etc.), sulfoxides (e.g., dimethylsulfoxide, etc.), sulfones (e.g., sulfolane, etc.), urea, acetonitrile, and acetone.

The water-based pigmented ink of this invention may optionally contain a surfactant. Exampled of preferred surfactants include anionic surfactants such as dialkylsulfosuccinates, alkylnaphthalenesulfonates, and fatty acid salts; nonionic surfactants such as polyoxyethylene alkyl ethers, polyoxyethylene alkylary ethers, acetylene glycols, polyoxyethylene-polyoxypropylene block copolymers and cationic surfactants such as alkylamines, and quaternary ammonium salts. Of these, anionic surfactants and nonionic surfactants are preferred. Further, the water-based pigmented ink may optionally contain an antiseptic, antimold or viscosity-adjusting agent.

Media recorded with the water base pigment ink of this invention include, for example, plain paper, coated paper, glossy paper for ink jet printing, glossy film for ink jet printing and transparencies for ink jet printing. In cases when recorded on plain paper or coated paper using the water-based pigmented ink according to this invention, superior performance including water resistance and abrasion resistance can be achieved. Specifically in cases when recorded on glossy paper, glossy film or transparency for ink jet printing, each exhibiting a glossiness at an angle of 60° of not less than 30%, specifically superior performance can be achieved. The glossy paper for ink jet printing is highly glossy media, including resin-coated paper in which one side or both sides of water-absorptive paper or base paper are coated with polyester resin and a media in which an ink-absorbing layer is coated on one side or both sides of baryta paper. Herein, the glossiness at an angle of 60° refers to a 60° specular glossiness, as defined in JIS Z8741 (1983). The glossy film for ink jet printing refers to media in which an ink absorbing layer is provided on one side or both sides of a resin support such as polyester which has been kneaded with titanium oxide or provided with voids to shield light transmission. The transparency for ink jet printing refers to high light-transmissible media, in which an ink absorbing layer is provided on one side or both sides of a resin support such as polyethylene terephthalate.

The glossiness of a medium is a value obtained by measurement with a glossmeter True Gloss GM-26 PRO, available from Murakami Shikisai Kenkyusho. Ink jet printheads used in ink jet recording include drop-on-demand systems and continuous jet systems. Discharging (or emitting) systems include, for example, an electric-to-mechanical conversion system (e.g., single cavity type, double cavity type, bender type, piston type, share-mode type, shared wall type, etc.), electricity-to-heat conversion type (e.g., thermal ink jet, bubblejet, etc.), static aspiration type (e.g., electric field control system, slit jet type, etc.) and discharge type (e.g., spark jet type, etc.).

EXAMPLES

The present invention will be further described based on examples, but embodiments of the invention are by no means limited to these examples.

In Examples and Comparative Examples, the particle size of pigment dispersions or latexes was measured using ZETASIZER 1000 (available from Malvern Instrument Inc.).

Examples 1 and 2, Comparative Examples 1 and 2
Preparation of Yellow Pigment Dispersion 1 and 2

| Yellow pigment dispersion 1 | |
| --- | --- |
| C.I. Pigment Yellow 128 | 150 g |
| Styrene-acrylic acid-methyl methacrylate copolymer (M.W. 10,000, acid value of 160) | 70 g |
| Ethylene glycol | 100 g |
| Glycerin | 80 g |
| Deionized water | 200 g |

The above-described composition was mixed and dispersed by using horizontal type beads mill which was filled with 0.3 mm zirconia beads in an amount of 60% by volume. The thus obtained yellow pigment dispersion 1 exhibited an average particle size of 125 nm.

Yellow Pigment Dispersion 2

Yellow pigment dispersion 1 was further subjected to a centrifugal separation treatment for 30 min. at 20,000 rpm to obtain yellow pigment dispersion 2. The average particle size of the yellow pigment dispersion 2 was 75 nm. Preparation of Ink 1 to 4

| Ink 1 | |
| --- | --- |
| Yellow pigment dispersion 2 | 167 g |
| Latex 1 (Nipol SX1503, available from Nippon Zeon Co. Ltd.) | 71.4 g |
| Ethylene glycol | 200 g |
| Diethylene glycol | 120 g |
| Olfin 1010 (available from Nishin Kagaku Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to obtain Ink 1.

| Ink 2 | |
| --- | --- |
| Yellow pigment dispersion 2 | 200 g |
| Latex 2 (Takelac W-605, available from Takeda Chemical Ind. Ltd.) | 33.3 g |
| Ethylene glycol | 200 g |
| Triethylene glycol monobutyl ether | 100 g |
| Olfin 1010 (available from Nishin Kagaku Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to obtain Ink 2.

| Ink 3 | |
| --- | --- |
| Yellow pigment dispersion 1 | 100 g |
| Latex 2 (Takelac W-605, available from Takeda Chemical Ind. Ltd.) | 66.7 g |
| Ethylene glycol | 200 g |
| Diethylene glycol | 100 g |
| Olfin 1010 (available from Nishin Kagaku Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to obtain Ink 3.

| Ink 4 | |
| --- | --- |
| Yellow pigment dispersion 2 | 167 g |
| Latex 3 (Superflex 420, available from Dai-ichi Kogyo Seiyaky Co. Ltd.) | 62.5 g |
| Ethylene glycol | 200 g |
| Triethylene glycol monobutyl ether | 100 g |
| Fluorinated surfactant 1 (megafac F144D available from Dainippon Ink Kagaku Kogyo) | 1.5 g |
| Proxel GXL (available from Zeneca Corp.) | 2 g |

Deionized water was added to make 1000 g and the mixture was allowed to pass through milipore filter of 1 μm pore diameter twice to obtain Ink 4.

Preparation of Evaluation Sample

Using an on-demand type ink jet printer installed with a piezoelectric type print-head of a nozzle orifice diameter of 20 μm, a driving frequency of 12 kHz, the nozzle number of 128 per one color and a nozzle density among the same colors of 180 dpi and exhibiting the maximum recording density of 720×720 dpi, a uniform image pattern giving a reflection density of 1.2 was recorded on Photoprint Paper 2, available from Seiko Epson Co. Ltd. (exhibiting a glossiness at an angle of 60° of 45%), using Inks 1 through 4.

Evaluation of Water Resistance

After the thus printed samples were each allowed to dry for 1 hr. in an atmosphere of 20° C. and 50% RH, the image area was divided to two portions and one of them was immersed in deionized water at 20° C. for 30 min. After pulling up the image, both sides thereof were wiped to remove water and sufficiently dried in an atmosphere of 20° C. and 50% RH. Thereafter, using an optical densitometer X-Rite 938 (available from Nippon Heihan Kizai Co. ltd.), an optical reflection density of an image potion immersed in water, based on blue light (reflection density of the immersed portion) and an optical reflection density of an image potion unimmersed in water, based on blue light (reflection density of the unimmersed portion) were each measured to determine a residual dye proportion (%), as defined below. Thus, water resistance was evaluated based on the residual dye percentage.

Residual dye (%)=[(reflection density of the immersed portion)–(reflection density of the unimmersed portion)]×100.

Evaluation of Abrasion Resistance

Printed samples each were placed on a fixed flat plate so that the image surface was upwardly placed, further thereon, a sterilized gauze-attached board (3 cm square) was placed and the printed surface was rubbed by allowing the board to move back and forth 100 times, while loading a load of 2 kg. The optical reflection density of images before or after being rubbed was measured at three points to determine the optical reflection density before being rubbed (the average reflection density before subjected to abrasion resistance test) and the optical reflection density after being rubbed (the average reflection density after subjected to abrasion resistance test). Further, residual dye proportion (%), as defined below, and the abrasion resistance was evaluated based on the residual dye percentage:

Residual dye (%)=[(reflection density after subjected to abrasion resistance test)/(reflection density before subjected to abrasion resistance test)]×100.

Measurement of Glossiness

The glossiness was measure at three points for each of printed samples, using a 60° specular gloss meter True Gross GM-26PRO (available from Murakami Shikisai Kenkyujo Co. Ltd.). The glossiness was represented by the average of measured values.

Obtained results are shown in Table 1.

TABLE 1

| Ink | | Av. Particle Size of Pigment (a) | Av. Particle Size of Latex (b) | Amount of Latex (wt %) | a/b | Water Resistance | Abrasion Resistance | Glossiness | Remark |
|---|---|---|---|---|---|---|---|---|---|
| Example 1 | 1 | 75 | 60 | 3 | 1.25 | 100% | 100% | 85% | Inv. |
| Example 2 | 2 | 75 | 80 | 1 | 0.94 | 99% | 98% | 83% | Inv. |
| Comp. Example 1 | 3 | 125 | 80 | 2 | 1.56 | 89% | 91% | 48% | Comp. |
| Comp. Example 2 | 4 | 75 | 12 | 2 | 6.25 | 94% | 92% | 64% | Comp. |

As can be seen from Table 1, highly glossy images exhibiting high superior resistance to water and abrasion were obtained according to the use of water-based pigmented inks for ink jet printing of this invention and the ink jet recording method of this invention.

Examples 3 to 9 and Comparative Example 3 to 5

Preparation of Magenta Pigment Dispersions 1 and 2

| Magenta pigment dispersion 1 | |
|---|---|
| C.I. Pigment Red 122 | 100 g |
| Demol C | 63 g |
| Glycerin | 100 g |
| Deionized water | 130 g |

The above-described composition was mixed and dispersed by using horizontal type beads mill which was filled with 0.3 mm zirconia beads in an amount of 60% by volume (System Zeta Mini, available from Ashizawa Co. Ltd.). The thus obtained magenta pigment dispersion 1 exhibited an average particle size of 65 nm.

| Magenta pigment dispersion 2 | |
|---|---|
| C.I. Pigment Red 122 | 100 g |
| Johncryl 61 (acryl-styrene type resin, available from Johnson Corp.) | 60 g |
| Diethylene glycol | 100 g |
| Deionized water | 130 g |

The above-described composition was mixed and dispersed by using horizontal type beads mill which was filled with 0.3 mm zirconia beads in an amount of 60% by volume (System Zeta Mini, available from Ashizawa Co. Ltd.) and then subjected to a centrifugal separation treatment at 20,000 rpm for 30 min. The thus obtained magenta pigment dispersion 2 exhibited an average particle size of 35 nm.

Preparation of Inks 5 to 14

| Ink 5 | |
|---|---|
| Magenta pigment dispersion 1 | 160 g |
| Latex 4 (Superflex 460, available from Dai-ichi Kogyo Seiyaky Co. Ltd.) | 210 g |
| Diethylene glycol | 180 g |
| Glycerin | 80 g |
| Exemplified Compound 2 | 5 g |
| Pelex OT-P (available from Kao Co. Ltd.) | 5 g |
| Proxel GXL (available from Zeneca Corp.) | 2 g |

Deionized water was added to make 1000 g and the mixture was allowed to pass through milipore filter of 1 μm pore diameter twice to obtain Ink 5.

| Ink 6 | |
|---|---|
| Magenta pigment dispersion 1 | 160 g |
| Latex 2 (Takelac W-605, available from Takeda Chemical Ind. Ltd.) | 133.3 g |
| Diethylene glycol | 180 g |
| Glycerin | 80 g |
| Fluorinated surfactant 1 (megafac F144D available from Dainippon Ink Kagaku Kogyo) | 3 g |
| Proxel GXL (available from Zeneca Corp.) | 2 g |

Deionized water was added to make 1000 g and the mixture was allowed to pass through milipore filter of 1 μm pore diameter twice to obtain Ink 6.

| Ink 7 | |
|---|---|
| Magenta pigment dispersion 2 | 140 g |
| Latex 3 (Superflex 420, available from Dai-ichi Kogyo Seiyaky Co. Ltd.) | 62.5 g |
| Diethylene glycol | 180 g |
| Glycerin | 80 g |
| Emulgen 120 (available from Kao Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to obtain Ink 7.

| Ink 8 | |
|---|---|
| Magenta pigment dispersion 2 | 140 g |
| Latex 5 (Takelac W-6010, available from Takeda Chemical Ind. Ltd.) | 33.3 g |
| Diethylene glycol | 180 g |
| Glycerin | 80 g |

-continued

| Ink 8 | |
|---|---|
| Hydrophilic silicone compound 1 (KF700, available from Shietsu Silicone Co. Ltd.) | 4 g |
| Pelex OT-P (available from Kao Co. Ltd.) | 5 g |
| Proxel GXL (available from Zeneca Corp.) | 2 g |

Deionized water was added to make 1000 g and the mixture was allowed to pass through milipore filter of 1 $\mu$m pore diameter twice to obtain Ink 8.

| Ink 9 | |
|---|---|
| Magenta pigment dispersion 2 | 140 g |
| Latex 4 (Superflex 460, available from Dai-ichi Kogyo Seiyaky Co. Ltd.) | 78.9 g |
| Diethylene glycol | 180 g |
| Triethylene glycol monomethyl ether | 86 g |
| Emulgen 120 (available from Kao Co. Ltd.) | 4 g |
| Proxel GXL (available from Zeneca Corp.) | 2 g |

Deionized water was added to make 1000 g and the mixture was allowed to pass through milipore filter of 1 $\mu$m pore diameter twice to obtain Ink 9.

| Ink 10 | |
|---|---|
| Magenta pigment dispersion 2 | 140 g |
| Latex 3 (Superflex 420, available from Dai-ichi Kogyo Seiyaky Co. Ltd.) | 62.5 g |
| Diethylene glycol | 150 g |
| Triethylene glycol monomethyl ether | 85 g |
| Exemplified Compound 3 | 5 g |
| Emulgen 120 (available from Kao Co. Ltd.) | 4 g |
| Proxel GXL (available from Zeneca Corp.) | 2 g |

Deionized water was added to make 1000 g and the mixture was allowed to pass through milipore filter of 1 $\mu$m pore diameter twice to obtain Ink 10.

| Ink 11 | |
|---|---|
| Magenta pigment dispersion 2 | 140 g |
| Latex 5 (Takelac W-6010, available from Takeda Chemical Ind. Ltd.) | 16.7 g |
| Diethylene glycol | 160 g |
| Glycerin | 100 g |
| Hydrophilic silicone compound 2 (KF351, available from Shietsu Silicone Co. Ltd.) | 6 g |
| Proxel GXL (available from Zeneca Corp.) | 2 g |

Deionized water was added to make 1000 g and the mixture was allowed to pass through milipore filter of 1 $\mu$m pore diameter twice to obtain Ink 11.

| Ink 12 | |
|---|---|
| Magenta pigment dispersion 1 | 160 g |
| Diethylene glycol | 200 g |
| Glycerin | 80 g |

| Ink 12 | |
|---|---|
| Pelex OT-P (available from Kao Co. Ltd.) | 5 g |
| Proxel GXL (available from Zeneca Corp.) | 2 g |

Deionized water was added to make 1000 g and the mixture was allowed to pass through milipore filter of 1 $\mu$m pore diameter twice to obtain Ink 12.

| Ink 13 | |
|---|---|
| Magenta pigment dispersion 2 | 140 g |
| Latex 6 (Superflex 110, available from Dai-ichi Kogyo Seiyaky Co. Ltd.) | 100 g |
| Diethylene glycol | 170 g |
| Glycerin | 85 g |
| Emulgen 120 (available from Kao Co. Ltd.) | 4 g |
| Proxel GXL (available from Zeneca Corp.) | 2 g |

Deionized water was added to make 1000 g and the mixture was allowed to pass through milipore filter of 1 $\mu$m pore diameter twice to obtain Ink 13.

| Ink 14 | |
|---|---|
| Magenta pigment dispersion 2 | 140 g |
| Latex 3 (Superflex 420, available from Dai-ichi Kogyo Seiyaky Co. Ltd.) | 375 g |
| Diethylene glycol | 100 g |
| Glycerin | 50 g |
| Emulgen 120 (available from Kao Co. Ltd.) | 4 g |
| Proxel GXL (available from Zeneca Corp.) | 2 g |

Deionized water was added to make 1000 g and the mixture was allowed to pass through milipore filter of 1 $\mu$m pore diameter twice to obtain Ink 14.

Preparation of Evaluation Sample

Using an on-demand type ink jet printer installed with a piezoelectric type print-head of a nozzle orifice diameter of 20 $\mu$m, a driving frequency of 12 kHz, the nozzle number of 128 per one color and a nozzle density among the same colors of 180 dpi and exhibiting the maximum recording density of 720×720 dpi, a uniform image pattern giving a reflection density of 1.8 was recorded on Photo Jet Paper QP double weight available from Konica Corp. (exhibiting a glossiness at an angle of 45° of 34%), using Inks 5 through 14.

The thus obtained printed samples were evaluated with respect to water resistance and abrasion resistance in a manner similar to Examples 1 and 2 and Comparative Examples 1 and 2, except that the reflection density was measured with green light. Obtained results are shown in Table 2.

TABLE 2

| Ink | Av. Particle Size of Pigment (a) | Av. Particle Size of Latex (b) | Amount of Latex (wt %) | a/b | Water Resistance | Abrasion Resistance | Glossiness | Remark |
|---|---|---|---|---|---|---|---|---|
| Example 3 | 5 | 65 | 31 | 8 | 2.1 | 100% | 100% | 81% | Inv. |
| Example 4 | 6 | 65 | 80 | 4 | 0.81 | 100% | 100% | 82% | Inv. |
| Example 5 | 7 | 35 | 12 | 2 | 2.92 | 100% | 99% | 84% | Inv. |
| Example 6 | 8 | 35 | 60 | 1 | 0.58 | 97% | 98% | 85% | Inv. |
| Example 7 | 9 | 35 | 31 | 3 | 1.13 | 100% | 100% | 90% | Inv. |
| Example 8 | 10 | 35 | 12 | 2 | 2.92 | 99% | 99% | 83% | Inv. |
| Example 9 | 11 | 35 | 60 | 0.5 | 0.58 | 98% | 97% | 85% | Inv. |
| Comp. Example 3 | 12 | 65 | — | No | — | 15% | 25% | 55% | Comp. |
| Comp. Example 4 | 13 | 35 | 90 | 3 | 0.39 | 87% | 85% | 38% | Comp. |
| Comp. Example 5 | 14 | 35 | 12 | 12 | 2.92 | 99% | 98% | 41% | Comp. |

As can be seen from Table 2, highly glossy images exhibiting high superior resistance to water and abrasion were obtained according to the use of water-based pigmented inks for ink jet printing and the ink jet recording method of this invention.

Examples 10 and Comparative Example 6
Preparation of Cyan Pigment Dispersions

| Cyan pigment dispersion | |
|---|---|
| C.I. Pigment Red 15:3 | 100 g |
| Demol C | 63 g |
| Diethylene glycol | 100 g |
| Deionized water | 125 g |

The above-described composition was mixed and dispersed by using horizontal type beads mill which was filled with 0.3 mm zirconia beads in an amount of 60% by volume (System Zeta Mini, available from Ashizawa Co. Ltd.). The thus obtained cyan pigment dispersion exhibited an average particle size of 55 nm.
Preparation of Inks 15 to 19

| Ink 15 | |
|---|---|
| Yellow pigment dispersion 2 | 167 g |
| Latex 4 (Superflex 460, available from Dai-ichi Kogyo Seiyaky Co. Ltd.) | 26.3 g |
| Ethylene glycol | 200 g |
| Triethylene glycol monomethyl ether | 120 g |
| Olfin 1010 (available from Nishin Kagaku Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to obtain Ink 15.

| Ink 16 | |
|---|---|
| Cyan pigment dispersion 2 | 120 g |
| Latex 4 (Superflex 460, available from Dai-ichi Kogyo Seiyaky Co. Ltd.) | 52.6 g |
| Ethylene glycol | 200 g |
| Triethylene glycol monomethyl ether | 120 g |
| Olfin 1010 (available from Nishin Kagaku Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to-obtain Ink 16.

| Ink 17 | |
|---|---|
| Hostfine Black T (av. particle size of 50 nm, available from Clariant Co. Ltd.) | 167 g |
| Latex 4 (Superflex 460, available from Dai-ichi Kogyo Seiyaky Co. Ltd.) | 78.9 g |
| Ethylene glycol | 200 g |
| Triethylene glycol monomethyl ether | 120 g |
| Olfin 1010 (available from Nishin Kagaku Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to obtain Ink 17.

| Ink 18 | |
|---|---|
| Cyan pigment dispersion 2 | 120 g |
| Latex 4 (Superflex 460, available from Dai-ichi Kogyo Seiyaky Co. Ltd.) | 66.7 g |
| Ethylene glycol | 200 g |
| Glycerin | 96 g |
| Olfin 1010 (available from Nishin Kagaku Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to obtain Ink 18.

| Ink 19 | |
|---|---|
| Hostfine Black T (av. particle size of 50 nm, available from Clariant Co. Ltd.) | 167 g |
| Latex 7 (Superflex 110, available from Dai-ichi Kogyo Seiyaky Co. Ltd.) | 167 g |
| Ethylene glycol | 200 g |
| Glycerin | 80 g |
| Olfin 1010 (available from Nishin Kagaku Co. Ltd.) | 4 g |
| Proxel GXL (available from Zeneca Corp.) | 2 g |

Deionized water was added to make 1000 g and the mixture was allowed to pass through milipore filter of 1 μm pore diameter twice to obtain Ink 19.

Preparation of Evaluation Sample

Using an on-demand type ink jet printer installed with a piezoelectric type print-head of a nozzle orifice diameter of 20 μm, a driving frequency of 12 kHz, the nozzle number of 128 per one color and a nozzle density among the same colors of 180 dpi and exhibiting the maximum recording density of 720×720 dpi, a uniform image of each of yellow, magenta, cyan, black, blue, green and red and high definition color digital standard image date N3 (available from Nippon Kikaku Kyokai) were outputted on Photo Jet Paper QP double weight (available from Konica Corp. and exhibiting a glossiness at an angle of 60° of 33%), using a combination of inks as shown in Table 3.

Evaluation of Water Resistance

After the thus printed samples were each allowed to dry for 1 hr. in an atmosphere of 20° C. and 50% RH, the image area was immersed in deionized water at 20° C. for 30 min. After pulling up the image, both sides thereof were wiped to remove water and sufficiently dried in an atmosphere of 20° C. and 50% RH. Then, the image area was visually evaluated based on the following criteria.

Evaluation Criterion

A: No color change observed,
B: Slight decolorization observed, and
C: Marked decolorization and partial image damage observed.

Evaluation of Abrasion Resistance

Printed samples each were placed on a fixed flat plate so that the image surface was upwardly placed, further thereon, a sterilized gauze-attached board (3 cm square) was placed and the printed surface was rubbed by allowing the board to move back and forth 100 times, while loading a load of 2 kg. Abrasion resistance of each sample was evaluated based on the following criteria:

Evaluation Criterion

A: No image damage observed,
B: Slight surface damage but no image damage observed,
C: Apparent image damage observed.

Evaluation of Perception of Glossiness

Printed samples were visually evaluated with respect to perception of glossiness, based on the following criteria:

Evaluation Criterion

A: Entirely superior in perception of glossiness and no uneven glossiness observed,
B: Slightly deficient in perception of glossiness and uneven glossiness observed, and
C: Deficient in perception of glossiness.

Obtained results are shown in Table 3.

TABLE 3

| | Ink | Av. Particle Size of Pigment (a) | Av. Particle Size of Latex (b) | Amount of Latex (wt %) | a/b | Water Resistance | Abrasion Resistance | Perception of Glossiness | Remark |
|---|---|---|---|---|---|---|---|---|---|
| Example 10 | 15 | 75 | 31 | 1 | 2.42 | A | A | A | Inv. |
| | 9 | 35 | 31 | 2 | 1.13 | | | | |
| | 16 | 55 | 31 | 2 | 1.77 | | | | |
| | 17 | 50 | 31 | 3 | 1.61 | | | | |
| Comp. Example 6 | 4 | 75 | 21 | 2 | 6.25 | C | C | B | Comp. |
| | 13 | 35 | 90 | 3 | 0.39 | | | | |
| | 18 | 55 | 12 | 2 | 4.58 | | | | |
| | 19 | 50 | 12 | 3 | 4.17 | | | | |

As can be seen from Table 3, highly glossy images exhibiting high superior resistance to water and abrasion were obtained, even in color printing, according to the use of water-based pigmented inks for ink jet printing of this invention and the ink jet recording method of this invention.

Example 11 and Comparative Example 7

Preparation of Evaluation Sample

Using an on-demand type ink jet printer installed with a piezoelectric type print-head of a nozzle orifice diameter of 20 μm, a driving frequency of 12 kHz, the nozzle number of 128 per one color and a nozzle density among the same colors of 180 dpi and exhibiting the maximum recording density of 720×720 dpi, a uniform image of each of yellow, magenta, cyan, black, blue, green and red and SCID Image No. 2 (available from Nippon Kikaku Kyokai) were outputted on OHP film for ink jet printing, available from Seiko Epson Co. Ltd., using a combination of inks as shown in Table 4.

The thus obtained printed samples were evaluated with respect to water resistance and abrasion resistance in a manner similar to Example 10 and Comparative example 6. Transparency was visually evaluated based on the following criteria:

Evaluation Criterion

A: No haze observed,
B: Slight haze observed but entirely highly transparent,
C: Marked haze observed and deficient in clearness of transmitted light, and
D: Deficient transparency and poor coloring of transmitted light.

Obtained results are shown in Table 4.

TABLE 4

| | Ink | Av. Particle Size of Pigment (a) | Av. Particle Size of Latex (b) | Amount of Latex (wt %) | a/b | Water Resistance | Abrasion Resistance | Transparency | Remark |
|---|---|---|---|---|---|---|---|---|---|
| Example 11 | 15 | 75 | 31 | 1 | 2.42 | A | A | B | Inv. |
| | 9 | 35 | 31 | 2 | 1.13 | | | | |
| | 16 | 55 | 31 | 2 | 1.77 | | | | |
| | 17 | 50 | 31 | 3 | 1.61 | | | | |
| Comp. Example 7 | 4 | 75 | 21 | 2 | 6.25 | D | D | D | Comp. |
| | 13 | 35 | 90 | 3 | 0.39 | | | | |
| | 18 | 55 | 12 | 2 | 4.58 | | | | |
| | 19 | 50 | 12 | 3 | 4.17 | | | | |

As can be seen from Table 3, when printed on transparency, highly glossy images exhibiting high superior resistance to water and abrasion were also obtained according to the use of water-based pigmented inks for ink jet printing of this invention and the ink jet recording method of this invention.

What is claimed is:

1. An inkjet recording method, wherein ink jet recording is made on a recording medium exhibiting a glossiness at an angle of 60° of not less than 30% by the use of a water-based pigmented ink for ink jet printing comprising a pigment and a latex, and wherein the average particle size of the pigment is 10 to 150 nm and the average particle size of the latex is 10 to 50 nm, satisfying the following requirement:

$$0.5 \leq a/b \leq 4$$

wherein a is the average particle size of the pigment and b is the average particle size of the latex;
   the content of the latex present in the ink is 0.1 to 10% by weight, based on the total weight of the ink; and
   the latex is a soap-free latex.

2. The ink jet recording method of claim 1, wherein the average particle size of the pigment is 10 to 100 nm and the following requirement is satisfied:

$$0.5 \leq a/b \leq 3.$$

3. The ink jet recording method of claim 1, wherein the ink contains an alkyl ether of a polyhydric alcohol in an amount of not less than 1% by weight.

4. The ink jet recording method of claim 1, wherein the ink contains a compound represented by the following formula (I):

formula (I)

wherein R is a saturated or unsaturated hydrocarbon group; n is an integer of 2 to 20; and M is sodium, potassium, lithium or a quaternary ammonium.

5. The ink jet recording method of claim 1, wherein the ink contains a fluorinated surfactant.

6. The ink jet recording method of claim 1, wherein the ink contains a hydrophilic silicone compound.

7. The ink jet recording method of claim 1, wherein the recording medium is selected from the group consisting of a glossy paper and a glossy film, each exhibiting a glossiness at an angle of 60° of not less than 30%.

* * * * *